(12) United States Patent  
Youngs

(10) Patent No.: US 8,166,324 B2
(45) Date of Patent: Apr. 24, 2012

(54) CONSERVING POWER BY REDUCING VOLTAGE SUPPLIED TO AN INSTRUCTION-PROCESSING PORTION OF A PROCESSOR

(75) Inventor: Lynn R. Youngs, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 880 days.

(21) Appl. No.: 12/103,349

(22) Filed: Apr. 15, 2008

(65) Prior Publication Data

US 2008/0195877 A1 Aug. 14, 2008

Related U.S. Application Data

(63) Continuation of application No. 11/213,215, filed on Aug. 25, 2005, now Pat. No. 7,383,453, which is a continuation of application No. 11/103,911, filed on Apr. 11, 2005, now Pat. No. 6,973,585, which is a continuation of application No. 10/135,116, filed on Apr. 29, 2002, now Pat. No. 6,920,574.

(51) Int. Cl.
*G06F 1/00* (2006.01)

(52) U.S. Cl. ........ 713/323; 713/300; 713/320; 713/322; 713/324

(58) Field of Classification Search .................. 713/300, 713/320, 322, 323, 324
See application file for complete search history.

(56) References Cited

U.S. PATENT DOCUMENTS

| | | | |
|---|---|---|---|
| 4,504,927 A | 3/1985 | Callan | |
| 4,509,113 A | 4/1985 | Heath | |
| 5,131,081 A | 7/1992 | MacKenna | |
| 5,179,666 A | 1/1993 | Rimmer | |
| 5,289,580 A | 2/1994 | Latif | |
| 5,291,585 A | 3/1994 | Sato | |
| 5,493,670 A * | 2/1996 | Douglis et al. | 713/324 |
| 5,666,537 A | 9/1997 | Debnath et al. | |
| 5,745,375 A | 4/1998 | Reinhardt | |
| 5,852,737 A | 12/1998 | Bikowsky | |
| 5,864,702 A | 1/1999 | Walsh | |

(Continued)

FOREIGN PATENT DOCUMENTS

EP 0632360 A1 1/1995

OTHER PUBLICATIONS

"Apple Inc.'s First Emended Answer, Defenses, and Counterclaims", *Nokia Corporation v. Apple Inc.*, United States District Court for the District of Delaware, Case No. 1:09-cv-00791-GMS, Feb. 19, 2010, 83 pages.

(Continued)

*Primary Examiner* — Thomas Lee
*Assistant Examiner* — Jaweed A Abbaszadeh
(74) *Attorney, Agent, or Firm* — Park, Vaughan, Fleming & Dowler LLP

(57) ABSTRACT

One embodiment of the present invention provides a system that facilitates reducing static power consumption of a processor. During operation, the system receives a signal indicating that instruction execution within the processor is to be temporarily halted. In response to this signal, the system halts an instruction-processing portion of the processor, and reduces the voltage supplied to the instruction-processing portion of the processor. Full voltage is maintained to a remaining portion of the processor, so that the remaining portion of the processor can continue to operate while the instruction-processing portion of the processor is in reduced power mode.

2 Claims, 3 Drawing Sheets

U.S. PATENT DOCUMENTS

| | | | |
|---|---|---|---|
| 6,272,642 | B2 | 8/2001 | Pole, II |
| 6,347,379 | B1 * | 2/2002 | Dai et al. .................... 713/320 |
| 6,425,086 | B1 | 7/2002 | Clark |
| 6,553,501 | B1 * | 4/2003 | Yokoe .......................... 713/320 |
| 6,715,090 | B1 | 3/2004 | Totsuka |
| 6,721,892 | B1 | 4/2004 | Osborn et al. |
| 6,738,675 | B2 | 5/2004 | Dai |
| 6,792,551 | B2 * | 9/2004 | Dai ............................... 713/320 |
| 6,795,896 | B1 | 9/2004 | Hart et al. |
| 6,816,977 | B2 * | 11/2004 | Brakmo et al. ............... 713/323 |
| 6,965,763 | B2 * | 11/2005 | Bussan et al. ............... 455/343.4 |
| 6,976,181 | B2 * | 12/2005 | Dai et al. ..................... 713/320 |
| 7,010,706 | B2 | 3/2006 | Clark |
| 7,281,144 | B2 * | 10/2007 | Banginwar et al. .......... 713/320 |
| 7,383,453 | B2 | 6/2008 | Youngs |
| 2003/0056127 | A1 | 3/2003 | Vaglica |
| 2003/0101362 | A1 * | 5/2003 | Dia ............................... 713/300 |
| 2003/0105983 | A1 * | 6/2003 | Brakmo et al. ............... 713/320 |
| 2003/0120959 | A1 | 6/2003 | Bohrer et al. |
| 2003/0120962 | A1 | 6/2003 | Dai et al. |
| 2003/0196126 | A1 * | 10/2003 | Fung ............................. 713/300 |
| 2005/0177755 | A1 * | 8/2005 | Fung ............................. 713/300 |
| 2007/0157041 | A1 * | 7/2007 | Youngs ......................... 713/300 |

OTHER PUBLICATIONS

"Nokia Corporation's and Nokia Inc.'s Answers to Apple's First Amended Counterclaims", *Nokia Corporation* v. *Apple Inc.*, United States District Court for the District of Delaware, Case No. 1:09-cv-00791-GMS, Jul. 1, 2010, 52 pages.

"Nokia's Supplemental Responses to Apple's Interrogatory No. 12", *Nokia Corporation* v. *Apple Inc.*, United States District Court of the District of Delaware, Case No. 1:09-cv-00791-GMS, Nov. 15, 2010, 6 pages.

"Exhibit J" to "Nokia's Supplemental Responses to Apple's Interrogatory No. 12", *Nokia Corporation* v. *Apple Inc.*, United States District Court for the District of Delaware, Case No. 1:09-cv-00791-GMS, Nov. 15, 2010, 13 pages.

"Complaint for Patent Infringement", *Apple Inc.* v *High Tech Computer Corp.* et al., United States District Court for the District of Delaware, Case No. 1:10-cv-00544-GMS , Jun. 21, 2010, 11 pages.

"High Tech Computer Corp. [et al]'s Answer and Counterclaims to Apple's Complaint for Patent Infringement", *Apple Inc.* v *High Tech Computer Corp.* et al., United States District Court for the District of Delaware, Case No. 1:10-cv-00544-GMS, Aug. 18, 2010, 17 pages.

* cited by examiner

CONSERVING POWER BY REDUCING VOLTAGE SUPPLIED TO AN INSTRUCTION-PROCESSING PORTION OF A PROCESSOR

RELATED APPLICATIONS

This application is a continuation of pending U.S. patent application Ser. No. 11/213,215, filed 25 Aug. 2005, which is itself a continuation of U.S. patent application Ser. No. 11/103,911, filed 11 Apr. 2005 (U.S. Pat. No. 6,973,585 B2), which is itself a continuation of U.S. patent application Ser. No. 10/135,116, (U.S. Pat. No. 6,920,574 B2) filed 29 Apr. 2002.

BACKGROUND

1. Field of the Invention

The present invention relates to techniques for conserving power usage in computer systems. More specifically, the present invention relates to a method and an apparatus for reducing power consumption in a processor by reducing voltage supplied to an instruction-processing portion of the processor, while maintaining voltage to other portions of the processor.

2. Related Art

Dramatic advances in integrated circuit technology have led to corresponding increases in processor clock speeds. Unfortunately, these increases in processor clock speeds have been accompanied by increased power consumption. Increased power consumption is undesirable, particularly in battery-operated devices such as laptop computers, for which there exists a limited supply of power. Any increase in power consumption decreases the battery life of the computing device.

Modern processors are typically fabricated using Complementary Metal Oxide Semiconductor (CMOS) circuits. CMOS circuits typically consume more power while the circuits are switching, and less power while the circuits are idle. Designers have taken advantage of this fact by reducing the frequency of (or halting) clock signals to certain portions of a processor when the processor is idle. Note that some portions of the processor must remain active, however. For example, a cache memory with its associated snoop circuitry will typically remain active, as well as interrupt circuitry and real-time clock circuitry.

Although reducing the frequency of (or halting) a system clock signal can reduce the dynamic power consumption of a processor, static power consumption is not significantly affected. This static power consumption is primarily caused by leakage currents through the CMOS devices. As integration densities of integrated circuits continue to increase, circuit devices are becoming progressively smaller. This tends to increase leakage currents, and thereby increases static power consumption. This increased static power consumption results in reduced battery life, and increases cooling system requirements for battery operated computing devices.

What is needed is a method and an apparatus that reduces static power consumption for a processor in a battery operated computing device.

SUMMARY

One embodiment of the present invention provides a system that facilitates reducing static power consumption of a processor. During operation, the system receives a signal indicating that instruction execution within the processor is to be temporarily halted. In response to this signal, the system halts an instruction-processing portion of the processor, and reduces the voltage supplied to the instruction-processing portion of the processor. Full voltage is maintained to a remaining portion of the processor, so that the remaining portion of the processor can continue to operate while the instruction-processing portion of the processor is in reduced power mode.

In one embodiment of the present invention, reducing the voltage supplied to the instruction-processing portion of the processor involves reducing the voltage to a minimum value that maintains state information within the instruction-processing portion of the processor.

In one embodiment of the present invention, reducing the voltage supplied to the instruction-processing portion of the processor involves reducing the voltage to zero.

In one embodiment of the present invention, the system saves state information from the instruction-processing portion of the processor prior to reducing the voltage supplied to the instruction-processing portion of the processor. This state information can either be saved in the remaining portion of the processor or to the main memory of the computer system.

In one embodiment of the present invention, upon receiving a wakeup signal, the system: restores full voltage to the instruction-processing portion of the processor; restores state information to the instruction-processing portion of the processor; and resumes processing of computer instructions.

In one embodiment of the present invention, maintaining full voltage to the remaining portion of the processor involves maintaining full voltage to a snoop-logic portion of the processor, so that the processor can continue to perform cache snooping operations while the instruction-processing portion of the processor is in the reduced power mode.

In one embodiment of the present invention, the system also reduces the voltage to a cache memory portion of the processor. In this embodiment, the system writes cache memory data to main memory prior to reducing the voltage.

In one embodiment of the present invention, the remaining portion of the processor includes a control portion of the processor containing interrupt circuitry and clock circuitry.

In one embodiment of the present invention, the remaining portion of the processor includes a cache memory portion of the processor.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor 102

Figure 1A:
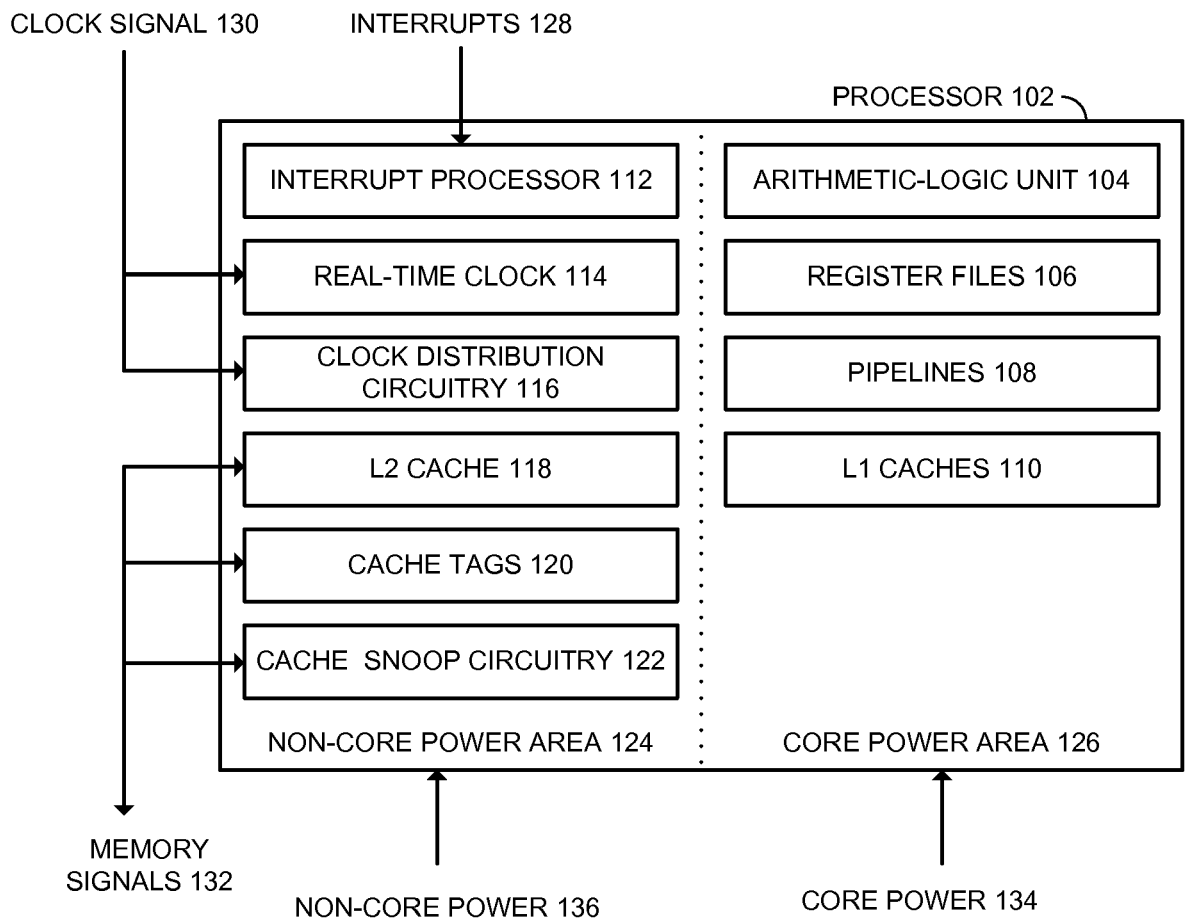
FIG. 1A illustrates different power areas within processor 102 in accordance with an embodiment of the present invention.

FIG. 1A illustrates different power areas within processor 102 in accordance with an embodiment of the present invention. Processor 102 is divided into a core power area 126, and a non-core power area 124. Core power area 126 includes the instruction-processing portion of processor 102. Specifically, core power area 126 includes arithmetic-logic unit 104, register files 106, pipelines 108, and possibly level one (L1) caches 110. Note that L1 caches 110 can alternatively be located in non-core power area 124.

Arithmetic-logic unit 104 provides computational and logical operations for processor 102. Register files 106 provide source operands, intermediate storage, and destination locations for instructions being executed by arithmetic-logic unit 104. Pipelines 108 provides a steady stream of instructions to arithmetic-logic unit 104. Instructions in pipelines 108 are decoded in transit. Therefore, pipelines 108 may contain instructions in various stages of decoding and execution. L1 caches 110 include data caches and instruction caches for arithmetic-logic unit 104. L1 caches 110 are comprised of very high-speed memory to provide fast access for instructions and data. In one embodiment of the present invention, L1 caches 110 includes a write-through data cache.

Non-core power area 124 comprises the remaining portion of processor 102 and includes interrupt processor 112, real-time clock 114, clock distribution circuitry 116, level two (L2) caches 118, cache tags 120, and cache snoop circuitry 122. In general, non-core power area 124 includes portions of processor 102 that are not directly involved in processing instructions, and that need to operate while instruction processing is halted.

Interrupt processor 112 monitors interrupts 128 and periodically interrupts the execution of applications to provide services to external devices requiring immediate attention. Interrupt processor 112 can also provide a wake-up signal to core power area 126 as described below. Real-time clock 114 provides time-of-day services to processor 102. Typically, real-time clock 114 is set upon startup from a battery operated real-time clock in the computer and thereafter provides time to the system. Clock distribution circuitry 116 provides clock signals for processor 102. Distribution of these clock signals can be switched off or reduced for various parts of processor 102. For example, clock distribution to core power area 126 can be stopped while the clock signals to non-core power area 124 continue. The acts of starting and stopping of these clock signals are known in the art and will not be described further. Real-time clock 114 and clock distribution circuitry 116 receive clock signal 130 from the computer system. Clock signal 130 is the master clock signal for the system.

L2 cache 118 provides a second level cache for processor 102. Typically, an L2 cache is larger and slower that an L1 cache, but still provides faster access to instructions and data than can be provided by main memory. Cache tags 120 provide an index into data stored in L2 cache 118. Cache snoop circuitry 122 invalidates cache lines base primarily on other processors accessing their own cache lines, or I/O devices doing memory transfers, even when instruction processing has been halted. L2 cache 118, cache tags 120, and cache snoop circuitry 122 communicate with the computer system through memory signals 132.

Non-core power area 124 receives non-core power 136 and core power area 126 receives core power 134. The voltage applied for non-core power 136 remains at a voltage that allows circuitry within non-core power area 124 to remain fully active at all times. In contrast, non-core power 136 may provide different voltages to non-core power area 124 based upon the operating mode of processor 102. For example, if processor 102 is a laptop attached to external electrical power, the voltage provided to non-core power 136 (and to core power 134 during instruction processing) may be higher than the minimum voltage, thus providing faster execution of programs.

The voltage applied to core power 134 remains sufficiently high during instruction processing so that core power area 126 remains fully active. However, when processor 102 receives a signal that processing can be suspended, the voltage supplied by core power 134 can be reduced.

In one embodiment of the present invention, the voltage in core power 134 is reduced to the minimum value that will maintain state information within core power area 126, but this voltage is not sufficient to allow processing to continue. In another embodiment of the present invention, the voltage at core power 134 is reduced to zero. In this embodiment, the state of core power area 126 is first saved before the voltage is reduced to zero. This state can be saved in a dedicated portion of L2 cache 118, in main memory, or in another dedicated storage area. Upon receiving an interrupt or other signal indicating that processing is to resume, the voltage in core power 134 is restored to a normal level, saved state is restored, and processing is restarted.

Figure 1B:
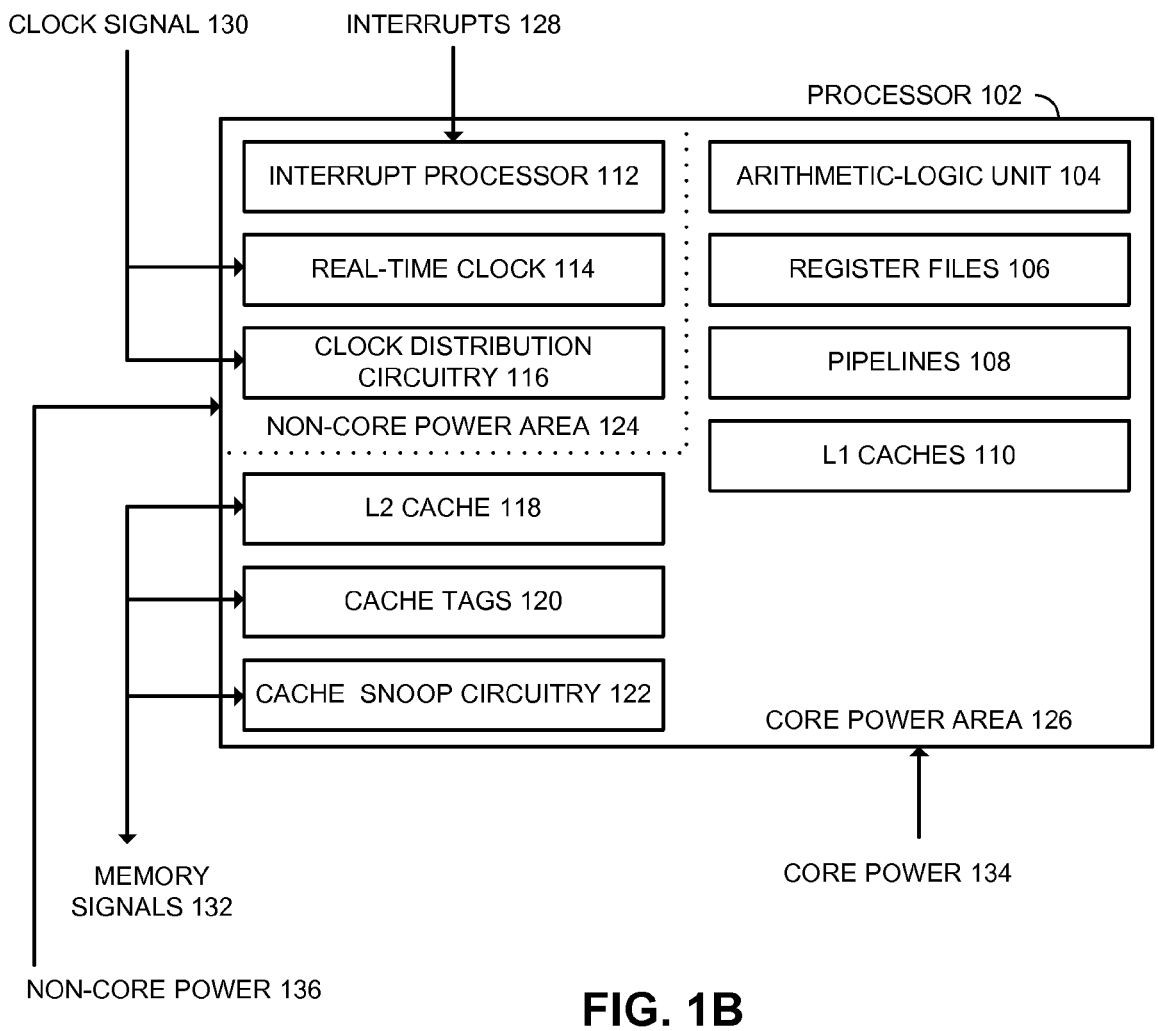
FIG. 1B illustrates alternate power areas within processor 102 in accordance with an embodiment of the present invention.

FIG. 1B illustrates an alternative partitioning of power areas within processor 102 in accordance with an embodiment of the present invention. As shown in FIG. 1B, L2 cache 118, cache tags 120, and cache snoop circuitry 122 are included in core power area 126 rather than in non-core power area 124. In this embodiment, the voltage supplied as core power 134 is reduced or set to zero as described above, however, the cache circuitry within processor 102 is also put into the reduced power mode. Prior to reducing the voltage supplied to core power area 126, data stored in L2 cache 118 is flushed to main memory. Additionally, if the voltage at core power 134 is reduced to zero, the state of processor 102 is first saved in main memory.

Monitoring and Switching

Figure 2:
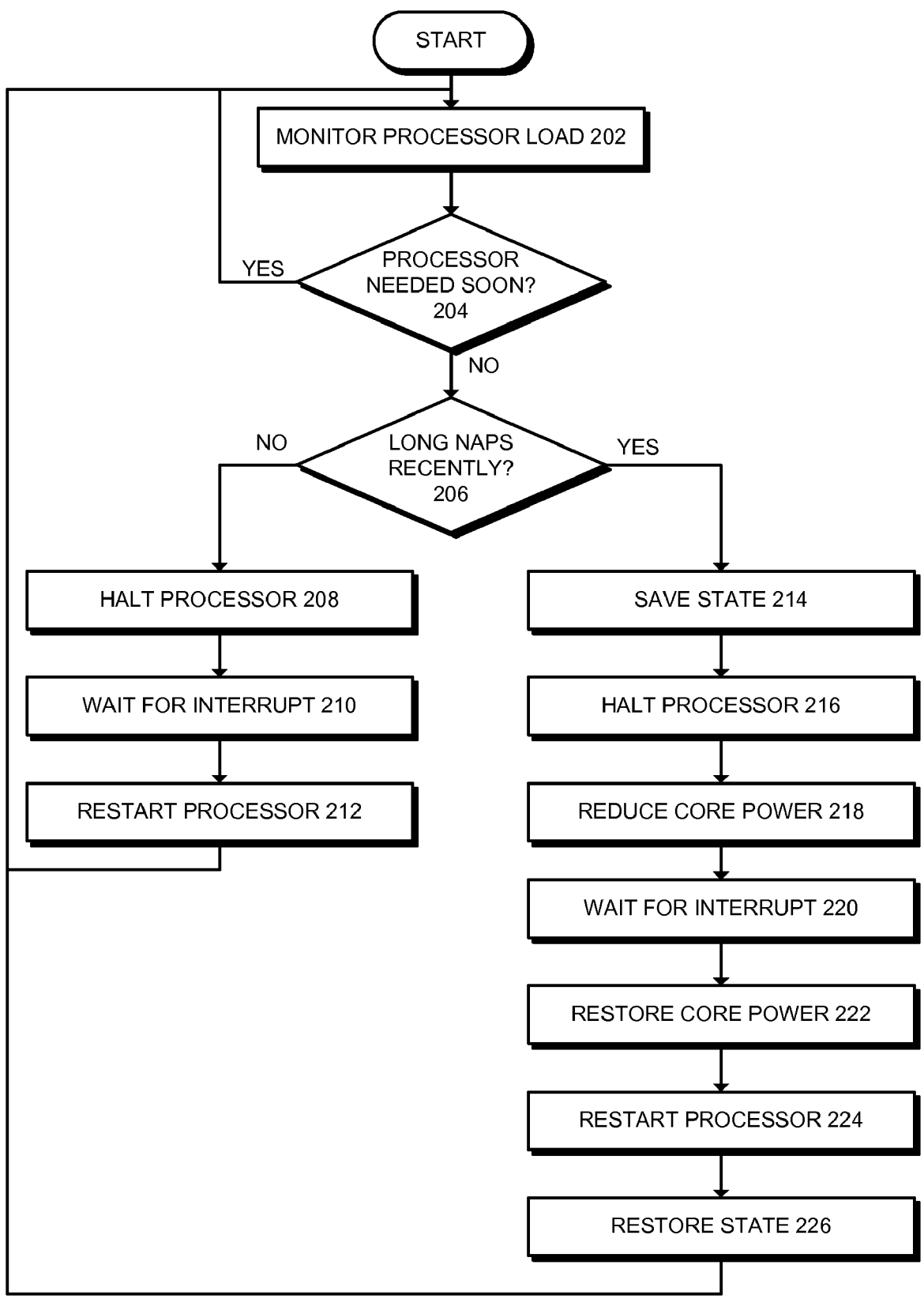
FIG. 2 is a flowchart illustrating the process of monitoring processor load and switching to power saving modes in accordance with an embodiment of the present invention.

FIG. 2 is a flowchart illustrating the process of monitoring processor load and switching to power saving modes in accordance with an embodiment of the present invention. The system starts by monitoring the processor load (step 202). Next, the system determines if the processor will be needed soon (step 204). This determination is made based on the current execution pattern and the cost of entering and recovering from nap mode. This cost, calculated in power usage, must be less than the power wasted by not going into nap mode. If the processor will be needed soon at step 204, the process returns to step 202 to continue monitoring the processor load.

If the processor will not be needed soon at step 204, the system determines if the processor has been taking long naps recently (step 206). If not, the system enters a normal nap mode, which involves halting the processor without reducing any voltages (step 208). Typically, halting the processor involves removing the clock signals to the core power area of the processor. After halting the processor, the system waits for an interrupt (step 210). Upon receiving an interrupt or other signal requiring a restart, the system restarts instruction processing (step 212). After restarting instruction processing, the process returns to step 202 to continue monitoring the processor load.

If the processor has recently been taking long naps at step 206, the system enters a deep nap mode, which involves saving the state information from the core power area (step 214), halting the processor (step 216), and then reducing the voltage supplied to the core power area (step 218). After reducing the voltage, the system waits for an interrupt (step 220).

Upon receiving the interrupt or other signal requiring a restart, the system restores the voltage to the core power area (step 222). Next, the modules within the core power area are restarted (step 224). The system then restores the state information that was saved at step 214 (step 226). After the processor has been restarted, the process returns to step 202 to continue monitoring the processor load. Note that the above description applies when the processor is used to save and restore the state information. In cases where dedicated hardware saves and restores the state information, steps 214 and 216, and steps 224 and 226 can be reversed. Note also that if the voltage supplied to the core power area 126 is reduced but maintained at a level where modules in the core power do not lose state information, steps 216 and 224 are not required.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method of transitioning to a nap mode in a processor, comprising:
  monitoring a load on the processor while the processor is operating;
  determining if the processor is to be needed soon by:
    determining a power usage during a current execution pattern;
    determining a cost in power usage of entering and recovering from a nap mode; and
    determining if the cost is greater than the power usage during the current execution pattern, wherein the processor is to be needed soon when the cost is greater;
  when the processor is to be needed soon, resuming monitoring the load on the processor without transitioning the processor to a nap mode; and
  when the processor is not to be needed soon, determining if the processor has been taking long naps recently;
    if not, transitioning the processor to a normal nap mode, which comprises halting a clock signal to a core power area of the processor without reducing an input voltage to the processor;
    otherwise, transitioning the processor to a deep nap mode, which comprises saving state information from the core power area, halting the clock signal to the core power area of the processor, and reducing a voltage supplied to the core power area.

2. The method of claim 1, wherein the method further comprises:
  after halting the clock signal to the core power area of the processor, awaiting at least one of an interrupt or a signal to restart the processor;
  upon receiving the at least one of the interrupt or the signal to start the processor, restarting instruction processing and resuming monitoring the load on the processor.

* * * * *